United States Patent
Shin et al.

(10) Patent No.: US 12,450,754 B2
(45) Date of Patent: Oct. 21, 2025

(54) METHOD AND APPARATUS FOR AQUIRING VISITOR INFORMATION

(71) Applicant: MAY-I INC., Seoul (KR)

(72) Inventors: In Sik Shin, Seoul (KR); Jun Hyuk Park, Seoul (KR); Jin Woo Park, Incheon (KR); Jae Hyun Kim, Seoul (KR); Yeo Hyun Park, Wonju-si (KR)

(73) Assignee: MAY-I INC., Seoul (KR)

( * ) Notice: Subject to any disclaimer, the term of this patent is extended or adjusted under 35 U.S.C. 154(b) by 389 days.

(21) Appl. No.: 17/769,374

(22) PCT Filed: Aug. 21, 2020

(86) PCT No.: PCT/KR2020/011194
§ 371 (c)(1),
(2) Date: Apr. 15, 2022

(87) PCT Pub. No.: WO2021/075700
PCT Pub. Date: Apr. 22, 2021

(65) Prior Publication Data
US 2023/0289978 A1    Sep. 14, 2023

(30) Foreign Application Priority Data
Oct. 18, 2019 (KR) .................. 10-2019-0129708

(51) Int. Cl.
*G06T 7/246* (2017.01)
*G06Q 30/0202* (2023.01)
(Continued)

(52) U.S. Cl.
CPC ......... *G06T 7/246* (2017.01); *G06Q 30/0202* (2013.01); *G06Q 30/0205* (2013.01);
(Continued)

(58) Field of Classification Search
None
See application file for complete search history.

(56) References Cited

U.S. PATENT DOCUMENTS 10,713,670 B1 * 7/2020 Moon ................ G06Q 30/0201
10,963,893 B1 * 3/2021 Sharma .............. G06F 18/256
(Continued)

FOREIGN PATENT DOCUMENTS

| CN | 111814522 B * | 5/2024 | ............ G06F 16/53 |
| JP | 4728229 B2 | 7/2011 | |

(Continued)

OTHER PUBLICATIONS

International Search Report of PCT/KR2020/011194 dated Nov. 30, 2020.

*Primary Examiner* — Fan Zhang
(74) *Attorney, Agent, or Firm* — Dinsmore & Shohl LLP; Yongsok Choi, Esq.

(57) ABSTRACT

A method for acquiring visitor information is provided. The method includes the steps of: detecting one or more visitor objects from a video; estimating attribute information of a first visitor using feature data of a first visitor object; acquiring a perspective model of the first visitor on the basis of a travel route of the first visitor object; and acquiring interaction information of the first visitor using the perspective model of the first visitor.

6 Claims, 7 Drawing Sheets

Path tracking in screen coordinate system

Conversion onto floor plan

(51) Int. Cl.
    *G06Q 30/0204*     (2023.01)
    *G06T 7/73*     (2017.01)
    *G06V 10/74*     (2022.01)
    *G06V 10/764*     (2022.01)
    *G06V 40/10*     (2022.01)
    *G06V 40/20*     (2022.01)

(52) U.S. Cl.
    CPC .............. *G06T 7/73* (2017.01); *G06V 10/761* (2022.01); *G06V 10/764* (2022.01); *G06V 40/10* (2022.01); *G06V 40/20* (2022.01); *G06T 2207/10016* (2013.01); *G06T 2207/30196* (2013.01); *G06T 2207/30241* (2013.01)

(56) References Cited

U.S. PATENT DOCUMENTS

2008/0159634 A1    7/2008    Sharma et al.
2019/0156276 A1    5/2019    Fisher et al.

FOREIGN PATENT DOCUMENTS

KR    1020020078707 A    10/2002
KR    1020170006356 A    1/2017
KR    1020170007070 A    1/2017
KR    1020180087947 A    8/2018

\* cited by examiner

Ideal trend plane

Actual trend plane

Line of intersection between actual trend plane and xy-plane

Path tracking in screen coordinate system

Conversion onto floor plan

METHOD AND APPARATUS FOR AQUIRING VISITOR INFORMATION

CROSS-REFERENCE TO RELATED APPLICATION(S)

This application is a continuation application of Patent Cooperation Treaty (PCT) International Application No. PCT/KR2020/011194 filed on Aug. 21, 2020, which claims priority to Korean Patent Application No. 10-2019-0129708 filed on Oct. 18, 2019. The entire contents of PCT International Application No. PCT/KR2020/011194 and Korean Patent Application No. 10-2019-0129708 are hereby incorporated by reference.

FIELD OF THE INVENTION

The present invention relates to a method and apparatus for acquiring visit information, and more specifically to a method and apparatus for acquiring visitor information by tracking a visitor object acquired from a video.

BACKGROUND

In order to measure a customer's interest in a product in a store, information on a purchase history or a stock status of the product is used. However, in the case of an experiential store or an exhibition store, it is difficult to acquire accurate data for measuring interests of customers since products are not sold. Therefore, there is a need to provide a technique for a method of measuring a customer's interest in a product using a captured video of a store.

SUMMARY OF THE INVENTION

Embodiments of the present invention provide a method and apparatus for measuring a visitor's demand for a product in a store using only video data of the store.

A visitor information acquisition method according to one embodiment of the invention may comprise the steps of: detecting one or more visitor objects from a video; estimating attribute information of a first visitor using feature data of a first visitor object; acquiring a perspective model of the first visitor on the basis of a travel route of the first visitor object; and acquiring interaction information of the first visitor using the perspective model of the first visitor.

According to one embodiment of the invention, the step of detecting the one or more visitor objects may comprise the steps of: detecting the first visitor object and a second visitor object; and changing an identification value of a second visitor to an identification value of the first visitor when similarity between the feature data of the first visitor object and feature data of the second visitor object is not less than a reference value.

According to one embodiment of the invention, the step of changing the identification value of the second visitor to the identification value of the first visitor may comprise the step of not changing the identification value of the second visitor to the identification value of the first visitor when the first visitor object and the second visitor object are detected from a single frame.

According to one embodiment of the invention, the step of detecting the one or more visitor objects may comprise the step of generating a graph corresponding to identification value information of the one or more visitor objects, wherein nodes of the graph correspond to the visitor objects and edges may be generated on the basis of similarity between the visitor objects corresponding to the nodes.

According to one embodiment of the invention, the step of generating the graph may comprise the step of removing an edge between nodes corresponding to the visitor objects that cannot exist in a single frame.

According to one embodiment of the invention, the step of generating the graph may comprise the step of generating a plurality of groups consisting of one or more nodes using a graph traversal algorithm, wherein the graph traversal algorithm may preferably be a breadth-first search (BFS) algorithm.

According to one embodiment of the invention, the step of generating the graph may comprise the step of not connecting an edge between a node corresponding to the first visitor object and a node corresponding to the second visitor object when the first visitor object and the second visitor object are detected from a single frame.

According to one embodiment of the invention, the feature data of the visitor objects are data on feature vectors of the visitor objects, and the similarity may be acquired by subtracting a cosine value corresponding to an angular distance between the feature vector of the first visitor object and the feature vector of the second visitor object from a cosine distance 1 as below:

$$\text{distance} = 1 - \cos(\theta) = 1 - \frac{a \cdot b}{\|a\| \cdot \|b\|}.$$

According to one embodiment of the invention, the perspective model is a linear model for transforming a screen coordinate system of the video to a real-world coordinate system, and the step of acquiring the interaction information of the first visitor may comprise the steps of: acquiring a travel route of the first visitor object using the perspective model of the first visitor; converting a travel route of the first visitor object in the screen coordinate system into a travel route of the first visitor in the real-world coordinate system on the basis of the perspective model of the first visitor; and acquiring the interaction information of the first visitor using the travel route of the first visitor in the real-world coordinate system.

According to one embodiment of the invention, the step of estimating the attribute information of the first visitor may comprise the step of acquiring pose data of the first visitor using the feature data of the first visitor object, and the step of acquiring the interaction information of the first visitor may comprise the step of using information on a product corresponding to the travel route of the first visitor in the real-world coordinate system and the pose data of the first visitor to acquire information on the first visitor's interaction with the product.

According to one embodiment of the invention, the step of acquiring the interaction information of the first visitor may comprise the steps of: acquiring a region-specific interest index of the first visitor on the basis of the travel route of the first visitor in the real-world coordinate system and a travel time; and designating a category of the first visitor using the region-specific interest index of the first visitor and the interaction information of the first visitor, wherein the category of the first visitor includes a visiting customer, an interested customer, an intrigued customer, and a purchasing customer.

According to one embodiment of the invention, the step of designating the category of the first visitor may comprise the steps of: generating a heat map for each category of the first visitor; and generating a two-dimensional graph from the interaction information of the first visitor.

A visitor information acquisition apparatus according to another embodiment of the invention comprises a processor that may be configured to: detect one or more visitor objects from a video; estimate attribute information of a first visitor using feature data of a first visitor object; acquire a perspective model of the first visitor on the basis of a travel route of the first visitor object; and acquire interaction information of the first visitor using the perspective model of the first visitor.

DETAILED DESCRIPTION

Figure 1:
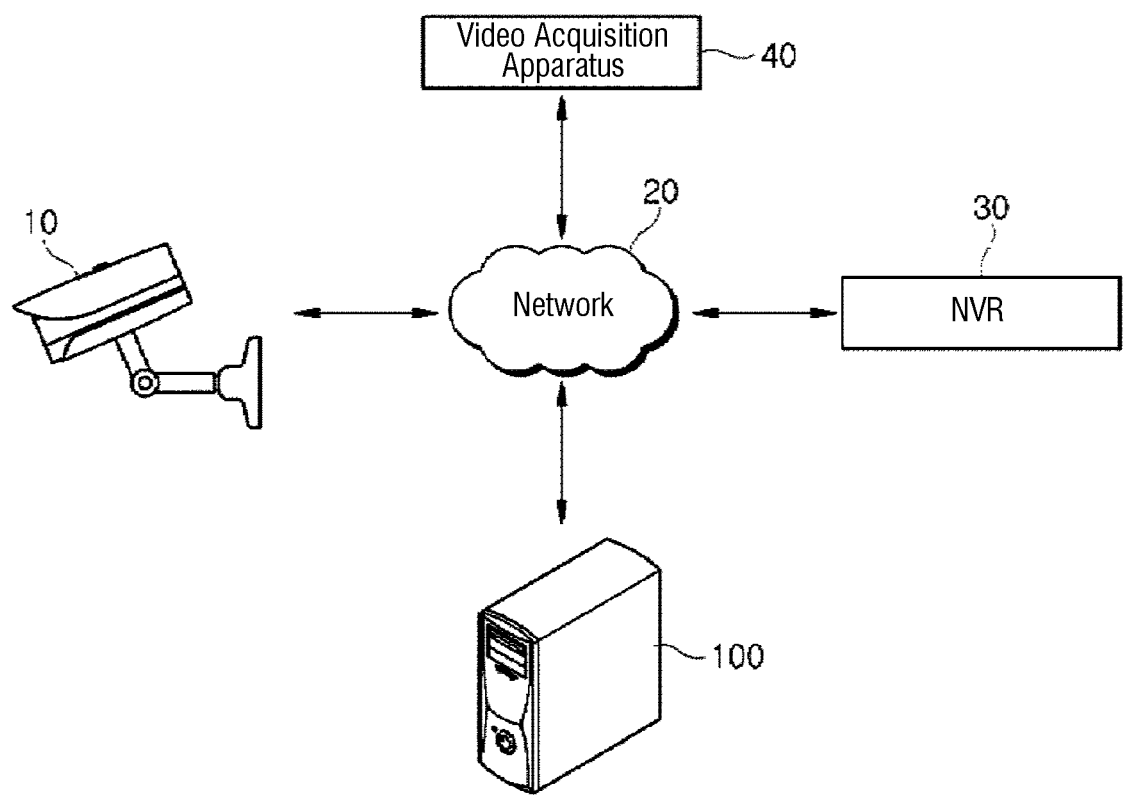
FIG. 1 shows an example of a visitor information acquisition system comprising a visitor information acquisition apparatus according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various embodiments of the present invention will be described in detail with reference to the accompanying drawings to enable those skilled in the art to easily implement the invention.

A visitor information acquisition system comprising a visitor information acquisition apparatus according to one embodiment of the invention will be described in detail below with reference to FIG. 1.

According to one embodiment of the invention, a visitor information acquisition system may comprise one or more cameras 10, a video acquisition apparatus 40, and a visitor information acquisition apparatus 100. According to some embodiments of the invention, the visitor information acquisition system may further comprise an NVR 30 to which a video of the camera is transferred.

According to one embodiment of the invention, the one or more cameras 10 may capture a video of a store and transfer the video to the NVR 30 via a network 20. According to one embodiment of the invention, the video acquisition apparatus 40 may transfer the video acquired by the camera 10 to the visitor information acquisition apparatus 100 via the network 20.

According to one embodiment of the invention, the visitor information acquisition apparatus 100 may acquire video data from the video acquisition apparatus 40. However, according to another embodiment of the invention, the visitor information acquisition apparatus 100 and the video acquisition apparatus 40 may not be implemented as physically separated hardware, and according to yet another embodiment of the invention, the visitor information acquisition apparatus 100 and the camera 10 may also not be implemented as physically separated hardware. In this case, the video acquisition apparatus 40 or the camera 10 may be included in the visitor information acquisition apparatus 100 as a module implemented as software.

According to one embodiment of the invention, the visitor information acquisition apparatus 100 may be configured to: detect one or more visitor objects from a video acquired from the camera 10 or the video acquisition apparatus 40; estimate attribute information of a visitor using feature data of a visitor object; acquire a perspective model of the visitor on the basis of a travel route of the visitor object; and acquire interaction information of the visitor using the acquired perspective model of the visitor. The foregoing will be described in detail below with reference to FIGS. 3 to 7B.

According to one embodiment of the invention, the visitor information acquisition apparatus 100 may acquire a region-specific interest index of the visitor, so that the store may use information on a product displayed in each pre-specified region to measure the visitor's interest in the product and predict expected demand for the product.

Further, according to one embodiment of the invention, the visitor information acquisition apparatus 100 may use a travel route and interaction information of the visitor to classify the visitor into one of a visiting customer, an interested customer, an intrigued customer, and a purchasing customer for each region of the store. The foregoing will be described in detail below with reference to the related drawings.

Figure 2:
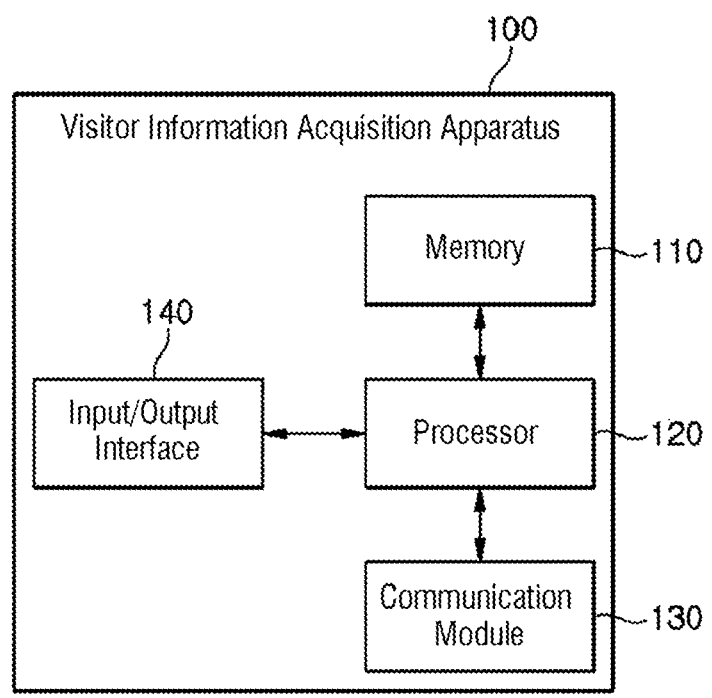
FIG. 2 is a hardware block diagram for illustrating a visitor information acquisition apparatus according to one embodiment of the invention.

FIG. 2 is a hardware block diagram for illustrating a visitor information acquisition apparatus according to one embodiment of the invention. The internal configuration of the visitor information acquisition apparatus according to one embodiment of the invention will be described in detail with reference to FIG. 2.

According to one embodiment of the invention, the visitor information acquisition apparatus 100 may comprise an input/output interface 140, a memory 110, a processor 120, and a communication module 130. The memory 110 may be a computer-readable recording medium, and may include random access memory (RAM), read only memory (ROM), and a permanent mass storage device such as a disk drive. Further, the memory 110 may temporarily or permanently store program codes and settings for controlling the visitor information acquisition apparatus 100, camera videos, and visitor information.

The processor 120 may be configured to process instructions of a computer program by executing basic arithmetic, logic, and input/output operations. The instructions may be provided to the processor 120 by the memory 110 or the communication module 130. For example, the processor 120 may be configured to execute received instructions according to program codes stored in a storage device (e.g., the memory 110).

The communication module 130 may function to communicate with an external server via the network. As an example, a request generated by the processor 120 of the visitor information acquisition apparatus 100 according to program codes stored in a storage device (e.g., the memory 110) may be transferred to the external server via the network under the control of the communication module 130. In contrast, the visitor information acquisition apparatus 100 may receive control signals or commands, contents, files, or the like, which are provided under the control of a processor of the external server, via the network through the communication module 130. For example, the control signals or commands of the external server received through the communication module 130 may be transferred to the processor 120 or the memory 110, and the contents or files may be stored in a storage medium, which may be further provided in the visitor information acquisition apparatus 100.

Further, the communication module 130 may communicate with the external server via the network. Although a communication scheme thereof is not particularly limited, the network may be a local area wireless communication network. For example, the network may be a Bluetooth, Bluetooth Low Energy (BLE), or WiFi communication network.

The input/output interface 140 may receive a user's input and display output data. The input/output interface 140 according to one embodiment of the invention may show statistical data generated using visitor information on a display.

In addition, according to other embodiments of the invention, the visitor information acquisition apparatus 100 may further include other components than those illustrated in FIG. 2. However, most of conventional components need not be explicitly illustrated. For example, the visitor information acquisition apparatus 100 may include a battery and a charging device for supplying power to internal components of the visitor information acquisition apparatus. Alternatively, the visitor information acquisition apparatus 100 may be implemented to include at least some of the above-described input/output devices, or may further include other components such as a transceiver, a global positioning system (GPS) module, various sensors, and a database.

Further, although not illustrated in FIG. 2, one or more camera modules may be included in the visitor information acquisition apparatus 100. According to one embodiment of the invention, the memory 110 may receive video data from the camera module. According to one embodiment of the invention, the camera module may include one or more individual cameras. For example, the camera module may be a camera module embedded in the visitor information acquisition apparatus, or may be a module connected with a separately provided camera device.

Figure 3:
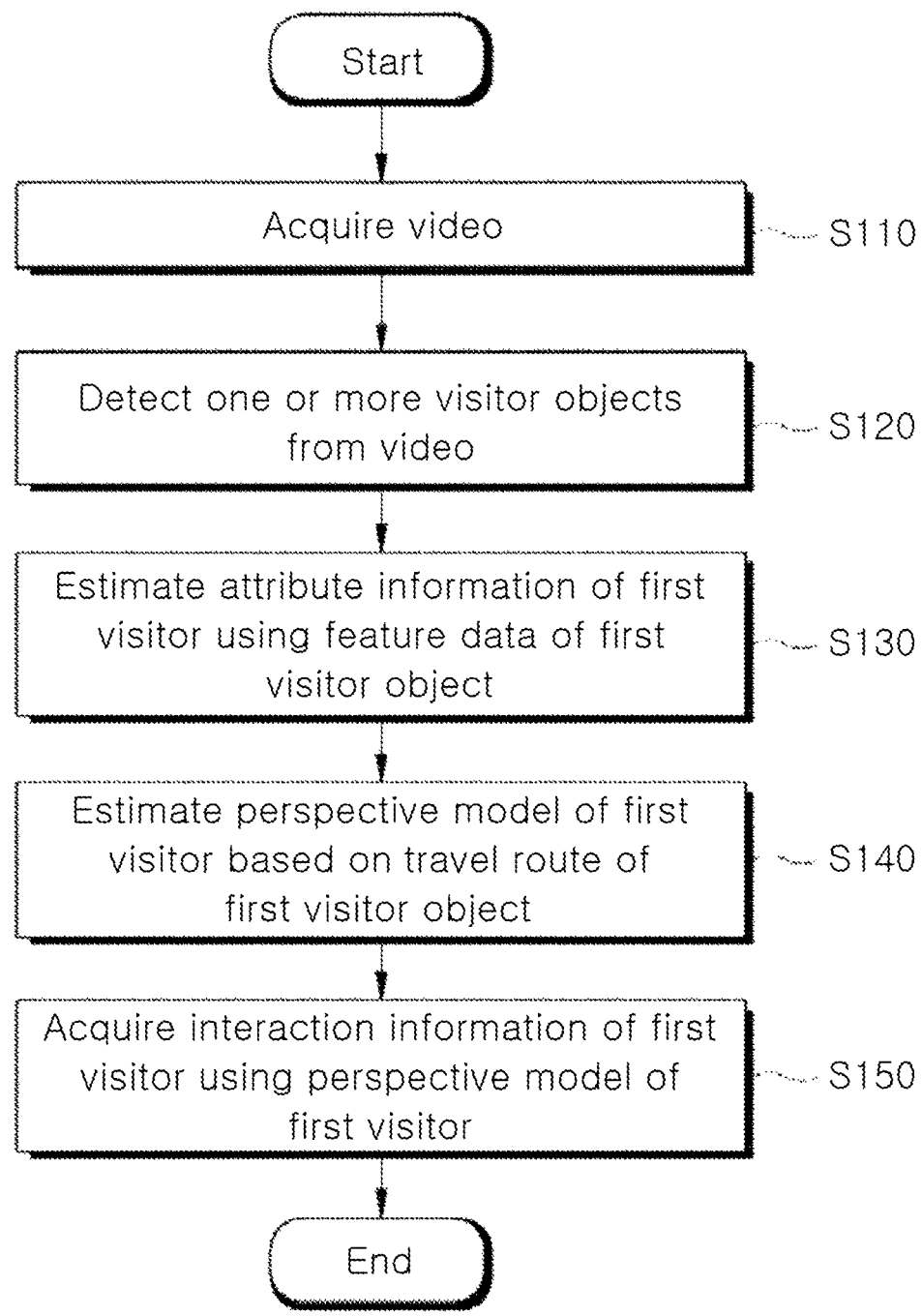
FIG. 3 is a flowchart of a visitor information acquisition method according to one embodiment of the invention.

FIG. 3 is a flowchart of a visitor information acquisition method according to one embodiment of the invention.

According to one embodiment of the invention, the visitor information acquisition apparatus may acquire a video (S110) and detect one or more visitor objects from the video (S120). According to one embodiment of the invention, the visitor information acquisition apparatus may detect a bounding box corresponding to a visitor. According to another embodiment of the invention, the visitor information acquisition apparatus may detect bounding boxes corresponding to a head and a body of the visitor, respectively, in order to accurately identify visitors.

Further, the visitor information acquisition apparatus according to one embodiment of the invention may perform visitor identification with high accuracy using a method of assigning a visitor object identification value to be described below with reference to FIG. 4.

According to one embodiment of the invention, the visitor information acquisition apparatus may estimate attribute information of a first visitor using feature data of a first visitor object (S130). According to one embodiment of the invention, the visitor information acquisition apparatus may embed the first visitor object to acquire vector data reflecting the features of the first visitor object. In this case, the visitor information acquisition apparatus may convert the first visitor object into an element in a specific vector space to acquire feature vector data of the first visitor.

For example, the visitor information acquisition apparatus may embed a head region and a body region of the first visitor to acquire feature vector data of the first visitor. The feature vector data of the first visitor acquired through the above process may be used to assign identification values of the one or more visitor objects detected in the step S120.

According to one embodiment of the invention, the visitor information acquisition apparatus may estimate a perspective model of the first visitor on the basis of a travel route of the first visitor object (S140). According to one embodiment of the invention, the visitor information acquisition apparatus may estimate a perspective model of the first visitor for acquiring an actual travel route of the first visitor on the basis of the travel route of the first visitor object. In this case, it should be noted that the travel route of the first visitor object is a travel route of a bounding box corresponding to the first visitor object based on a screen coordinate system, and the travel route of the first visitor is a travel route of the first visitor based on a real-world coordinate system.

According to one embodiment of the invention, the visitor information acquisition apparatus may estimate a linear perspective model whose normal vector varies with the height of the visitor. According to the embodiment of the invention, the visitor information acquisition apparatus may acquire a perspective model of each visitor on the basis of a line of intersection between a trend plane for each visitor object and the xy-plane in a three-dimensional coordinate system based on the x-coordinate of a bounding box corresponding to the visitor's head region, the y-coordinate of the bounding box corresponding to the visitor's head region, and the z-coordinate corresponding to the vertical length of the bounding box corresponding to the visitor's head region. The foregoing will be described in more detail below with reference to FIGS. 6A to 6C.

According to one embodiment of the invention, the visitor information acquisition apparatus may acquire interaction information of the first visitor using the perspective model of the first visitor (S150). According to one embodiment of the invention, the visitor information acquisition apparatus may acquire interaction information of the first visitor and a region-specific interest index of the first visitor using the perspective model of the first visitor.

According to one embodiment of the invention, the visitor information acquisition apparatus may designate a category of the first visitor as one of a visiting customer, an interested customer, an intrigued customer, and a purchasing customer using the region-specific interest index of the first visitor and the interaction information of the first visitor.

Figure 4:
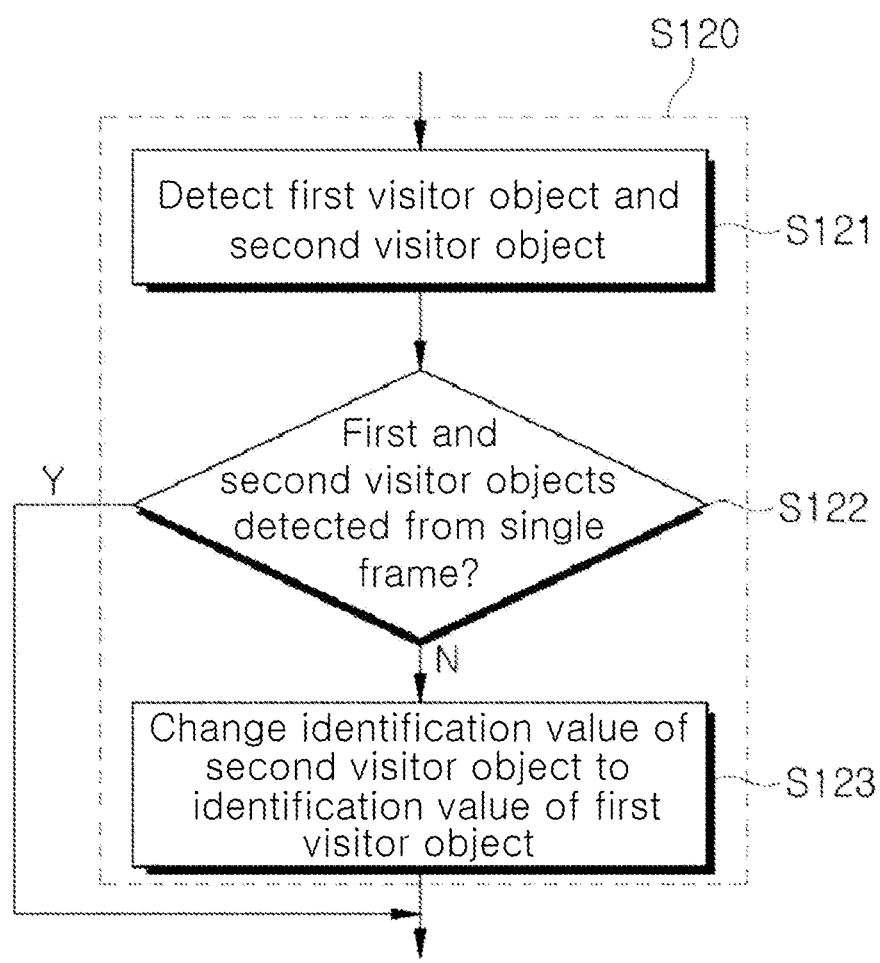
FIG. 4 specifically illustrates some of the steps shown in FIG. 3.

FIG. 4 illustrates a method of identifying a visitor according to one embodiment of the invention.

According to one embodiment of the invention, the visitor information acquisition apparatus may detect a first visitor object and a second visitor object (S121). According to one embodiment of the invention, the visitor information acquisition apparatus may independently detect a head region and a body region of a visitor in order to accurately detect a visitor object.

According to one embodiment of the invention, the visitor information acquisition apparatus may embed the head region and body region of the visitor to acquire feature vector data of each of the regions.

In this case, the visitor information acquisition apparatus may acquire feature vector data for the head region of the visitor instead of acquiring feature vector data for a face region of the visitor. When the feature vector data for the visitor's head region is acquired according to the embodiment of the invention, the features of a broader region including the visitor's face region may be detected. However, in this case, it should be noted that the feature vector data for the visitor's head region may be data detected only from the visitor's head region that is frontally captured by the camera.

According to one embodiment of the invention, the visitor information acquisition apparatus may acquire only feature vector data for the visitor's head region that is acquired from a part of a plurality of frame images included in the video, in order to reduce the amount of computing operations. The method of selecting a part of the frame images may include various methods such as a method of selecting frame images at regular intervals, a method of selecting a randomly specified number of frame images, or a method of selecting frame images only when the front of the visitor object is captured.

According to one embodiment of the invention, the visitor information acquisition apparatus may extract a head object image from the detected head region of the visitor, and acquire facial feature points from the head object image. For example, the facial feature points may be one or more of points corresponding to both eyes, a nose, and both ends of lips. According to one embodiment of the invention, the visitor information acquisition apparatus may acquire a head object image only when all of the above facial feature points satisfy a specified confidence score. The confidence score of the facial feature points may be acquired through a computer vision algorithm that may be used by those skilled in the art.

A method of embedding a body region of a visitor will be described below. According to one embodiment of the invention, the method of embedding the visitor's body region by the visitor information acquisition apparatus is similar to the above-described method of embedding the visitor's head region, while there is a problem that the body region is frequently hidden by an external structure or another visitor's body unlike the head region. Accordingly, the visitor information acquisition apparatus according to some embodiments of the invention may sort bounding boxes corresponding to the visitor's body region in ascending order of size of areas where the bounding boxes overlap other bounding boxes.

According to one embodiment of the invention, the visitor information acquisition apparatus may check whether the first visitor object and the second visitor object have been detected from a single frame (S122). When a specific visitor moves out of the view of the camera and enters the view of the camera again, detection of a plurality of visitor objects for a single visitor may be performed if the plurality of visitor objects overlap and the visitor travels non-linearly.

Accordingly, the visitor information acquisition apparatus according to one embodiment of the invention may adjust identification values assigned to the visitor objects in order to accurately identify the visitor objects. In this case, the visitor information acquisition apparatus may adjust the identification values assigned to the visitor objects by comparing similarity between vector data.

According to one embodiment of the invention, when the first visitor object and the second visitor object have not been detected from a single frame, the visitor information acquisition apparatus may change the identification value of the second visitor object to the identification value of the first visitor object (S123). Further, according to one embodiment of the invention, when the first visitor object and the second visitor object have been detected from a single frame, the identification value of the second visitor object may not be changed to the identification value of the first visitor object because the first visitor object and the second visitor object are highly likely to correspond to different person objects.

The visitor information acquisition apparatus according to some embodiments of the invention may represent visitor objects detected from the video in the form of a graph. In this case, the visitor information acquisition apparatus may represent the respective visitor objects detected from a plurality of frame images included in the video as nodes, and represent similarity between the visitor objects corresponding to the respective nodes as edges.

In this case, one or more visitor objects corresponding to nodes not connected by edges may be defined as a non-coexistent combination that cannot be simultaneously detected from a single frame. Accordingly, the visitor information acquisition apparatus according to some embodiments of the invention may remove edges so that nodes corresponding to a single visitor are not connected in the graph.

Figure 5:
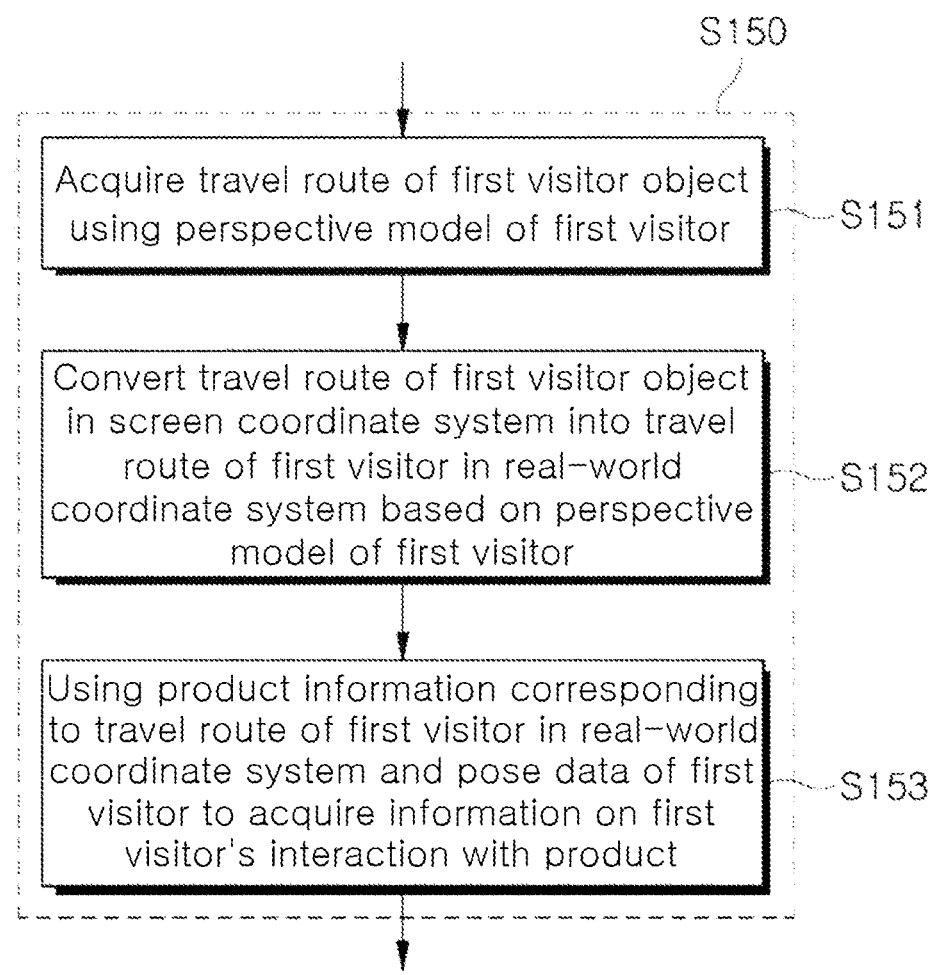
FIG. 5 specifically illustrates some of the steps shown in FIG. 3.

FIG. 5 illustrates a method for acquiring a travel route and interaction information of a visitor using a perspective model of the visitor according to one embodiment of the invention.

According to one embodiment of the invention, the visitor information acquisition apparatus may acquire a travel route of the first visitor object using the perspective model of the first visitor (S151). The visitor information acquisition apparatus may acquire a perspective model of a visitor on the basis of a line of intersection between a trend plane for each visitor object and the xy-plane in a three-dimensional coordinate system with the x-coordinate of a bounding box corresponding to the visitor's head region, the y-coordinate of the bounding box corresponding to the visitor's head region, and the z-coordinate corresponding to the vertical length of the bounding box corresponding to the visitor's head region.

According to one embodiment of the invention, the visitor's perspective model may be acquired in the form of $z=\alpha(x+y+b)$, where a is a constant that determines a normal vector of the plane and may vary with the height of each visitor. A method of acquiring the perspective model will be described in detail below with reference to FIGS. 6A to 6C.

According to one embodiment of the invention, the visitor information acquisition apparatus may convert a travel route of the first visitor object in a screen coordinate system into a travel route of the first visitor in a real-world coordinate system on the basis of the perspective model of the first visitor (S152). According to one embodiment of the invention, the visitor information acquisition apparatus may estimate height information of the visitor detected from the video, using the perspective model of the first visitor acquired in the step S151. Further, the visitor information acquisition apparatus may acquire a travel route of the visitor in the real-world coordinate system on the basis of the bounding box of the detected visitor object and the estimated height information of the visitor. The foregoing will be described in more detail below with reference to FIGS. 7A and 7B.

According to one embodiment of the invention, the visitor information acquisition apparatus may acquire interaction information of the first visitor using the travel route of the first visitor in the real-world coordinate system and pose data of the first visitor (S153). According to one embodiment of the invention, the visitor information acquisition apparatus may match the acquired travel route of the first visitor in the real-world coordinate system with floor plan information of a store visited by the first visitor to acquire region information of the store. Further, according to another embodiment of the invention, the visitor information acquisition apparatus may further acquire information on a time for which the first visitor stays in each region. According to yet another embodiment of the invention, the visitor information acquisition apparatus may further acquire pose data of the first visitor to acquire interaction information of the first visitor for products in each region of the store.

In addition, according to one embodiment of the invention, the visitor information acquisition apparatus may measure a region-specific interest index of the first visitor using the travel route of the first visitor and the interaction information of the first visitor. Thereafter, the visitor information acquisition apparatus may designate a category of the first visitor on the basis of the interest index of the first visitor. According to one embodiment of the invention, the first visitor may be designated into one or more categories of a visiting customer, an interested customer, an intrigued customer, and a purchasing customer.

A method of designating a category of the first visitor by the visitor information acquisition apparatus according to some embodiments of the invention will be described in detail below.

The visitor information acquisition apparatus according to one embodiment of the invention may acquire an interest index of a visitor on the basis of a travel route of the visitor. The interest index f(t) may be acquired using the following equation. Here, t is a spent time and $\alpha$ is a parameter for determining a time reference value by which interest is determined.

$$f(t) = \begin{cases} e^{t-\alpha}, & 0 \le t < \alpha \\ \ln(t - \alpha + 1), & \alpha \le t \end{cases} \quad \text{(EQ. 1)}$$

The visitor information acquisition apparatus according to one embodiment of the invention may acquire a time for which a visitor having an interest index of 1 or higher stays in a specific region. According to one embodiment of the invention, when the interest index is 1 or higher, the visitor detected by the visitor information acquisition apparatus may be a visitor who stays in the specific region longer than a threshold value. However, it should be noted that the reference value of the interest index is not limited to 1 as described above, and may be changed as long as modification thereof is made feasible by those skilled in the art.

According to another embodiment of the invention, the visitor information acquisition apparatus may convert a visitor's path into a heat map on the basis of the visitor's travel route. According to yet another embodiment of the invention, the visitor information acquisition apparatus may acquire visit order information of each visitor in a specific region. Moreover, and the visitor information acquisition apparatus may further acquire a travel route of each visitor in the store and resulting category information and interaction information of the visitor.

According to one embodiment of the invention, a visitor who is designated into a category of an interested customer may have an interest index of 1 or higher in a specific region. That is, in this case, the visitor may have stayed in the specific region longer than a threshold value.

According to one embodiment of the invention, a visitor who is designated into a category of an intrigued customer may have an interest index of 1 or higher in a specific region, and the visitor's interaction with the specific region may be detected. In this case, the visitor information acquisition apparatus may further acquire information on the interaction performed by the visitor designated into the category of the intrigued customer and information on a product with which the interaction is performed.

According to one embodiment of the invention, a visitor who is designated into a category of a purchasing customer may pay for a product so that payment information may exist. According to the embodiment of the invention, the visitor information acquisition apparatus according to some embodiments of the invention may use preprocessed information corresponding to the payment information in order to protect personal information, and may also use only product information excluding personal information of the visitor.

Figure 6A:
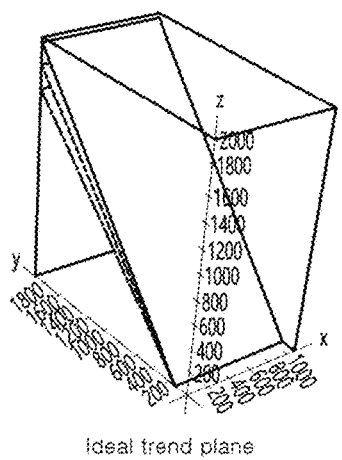
FIG. 6A illustrates a perspective model of a visitor according to one embodiment of the invention.
Figure 6B:
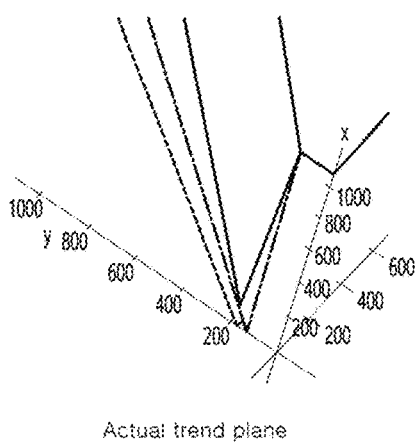
FIG. 6B illustrates a perspective model of a visitor according to one embodiment of the invention.
Figure 6C:
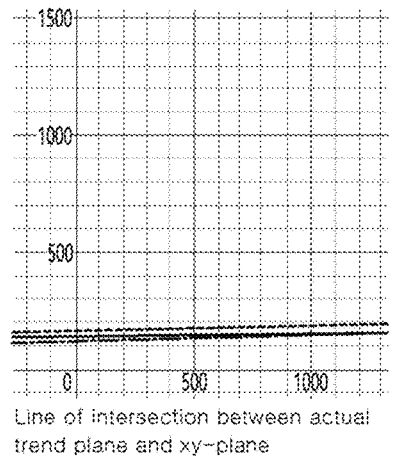
FIG. 6C illustrates a perspective model of a visitor according to one embodiment of the invention.

FIGS. 6A to 6C illustrate a perspective model of a visitor according to one embodiment of the invention.

A method of acquiring a perspective model of a visitor will be described in detail below with reference to FIGS. 6A to 6C.

According to one embodiment of the invention, with respect to each of one or more detected visitor objects, the visitor information acquisition apparatus may acquire three-dimensional coordinates based on the x-coordinate of a bounding box corresponding to each visitor's head region, the y-coordinate of the bounding box corresponding to the visitor's head region, and the z-coordinate corresponding to the vertical length of the bounding box corresponding to the visitor's head region. In this case, the visitor information acquisition apparatus may perform random sample consensus (RANSAC) to eliminate outliers. However, it should be noted that the method of eliminating outliers is not limited to the RANSAC and may include various methods that may be changed by those skilled in the art, and the outlier elimination may not be performed in other embodiments of the invention.

Thereafter, the visitor information acquisition apparatus may perform multiple linear regression analysis on the one or more acquired visitors, and coefficients (i.e., weights= $[w_1, w_2]$) and a constant (i.e., bias=b) may be acquired from a set of the above three-dimensional coordinates. Further, a trend plane may be acquired through regression analysis, and the acquired trend plane may be expressed as EQ. 2 below.

$$z = w_1x + w_2y + b \quad \text{(EQ. 2)}$$

When the regression analysis is ideally performed, a trend plane according to some embodiments of the invention may be illustrated as shown in FIG. 6A. In this case, at least one trend plane corresponding to at least one visitor may all generate the same line of intersection with the xy-plane. However, since most of the actual trend planes are illustrated as shown in FIG. 6B, the visitor information acquisition apparatus according to some embodiments of the invention may estimate one or more lines of intersection between one or more trend planes and the xy-plane.

More specifically, one or more lines of intersection between one or more actually generated trend planes and the xy-plane may be generated as shown in FIG. 6C. When a visitor object is detected from a 1080×1920 video, the visitor information acquisition apparatus according to one embodiment of the invention may analyze only the case in which $x \in [0, 1080]$. In this case, the visitor information acquisition apparatus may generate one or more data sets by substituting all x satisfying $0 \leq x \leq 1080$ into one or more lines of intersection acquired from one or more trend planes corresponding to one or more visitor objects.

Thereafter, the visitor information acquisition apparatus may perform orthogonal distance regression (ODR) to acquire a straight line representing the one or more lines of intersection. By performing the ODR instead of the linear regression analysis, it is possible to acquire a straight line that may geometrically represent the one or more lines of intersection. Through the foregoing, it is possible to acquire a straight line wx+y+b=0 on the xy-plane that represents the visitor's perspective model. That is, the perspective model corresponding to each visitor may be expressed as $z = \alpha(x + y + b)$, where a may be a constant that determines a normal vector of the plane corresponding to the height of the visitor.

Figure 7A:
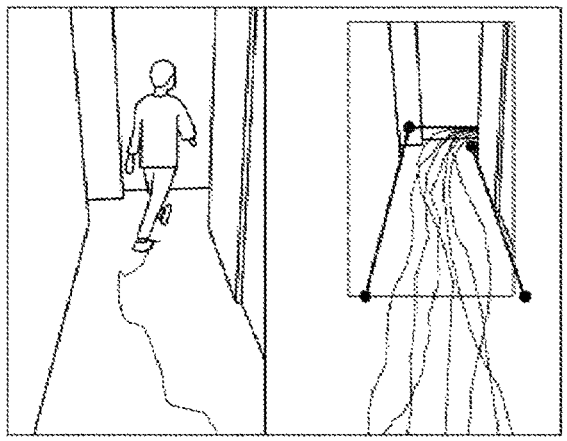
FIG. 7A illustrates a travel route of a visitor according to one embodiment of the invention.
Figure 7B:
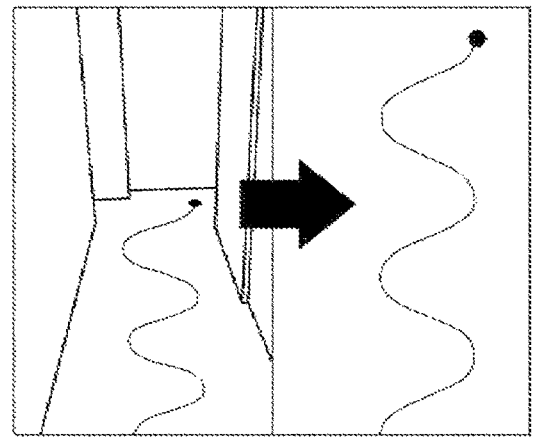
FIG. 7B illustrates a travel route of a visitor according to one embodiment of the invention.

FIGS. 7A and 7B illustrate a travel route of a visitor according to one embodiment of the invention.

According to one embodiment of the invention, the visitor information acquisition apparatus may estimate the height of the visitor using the perspective model. The visitor information acquisition apparatus according to the embodiment of the invention may estimate the height of the visitor object by a method to be described below even when some regions of a plurality of visitor objects are covered by structures or other visitor objects.

For example, it is assumed below that the visitor information acquisition apparatus according to one embodiment of the invention acquires a frame image in which a bounding box of a head region and a bounding box of a body region are simultaneously detected for all visitors. In this case, the visitor information acquisition apparatus may select a body bounding box of a visitor object in which no overlapping region exists between visitors.

Then, the visitor information acquisition apparatus may acquire a vertical distance between a center point of a lower end of the body bounding box corresponding to each of the plurality of visitors and a center point of the head bounding box of the visitor. When the coordinates of the body bounding box are [100, 300, 180, 580] and the coordinates of the head bounding box are [130, 320, 160, 360], the center point of the lower end of the body bounding box may be located at (140, 580) and the center point of the head bounding box may be located at (145, 340). In this case, the visitor information acquisition apparatus may acquire the vertical distance between the center point of the lower end of the body bounding box and the center point of the head bounding box as 240.

Thereafter, the visitor information acquisition apparatus may convert the acquired vertical distance between the center point of the lower end of the body bounding box and the center point of the head bounding box into a vertical distance at a specified point using the perspective model. Further, the height of each visitor may be estimated by calculating an average of the vertical distance at the specified point converted from the vertical distance between the center points for each visitor.

A method of acquiring a travel route of a visitor in a real-world coordinate system using the visitor's perspective model and height information acquired as above will be described in detail below.

According to one embodiment of the invention, the visitor information acquisition apparatus may estimate a travel route of a visitor object in a screen coordinate system using a perspective model and height information of a visitor. Thereafter, a top-view transformation may be performed to convert the travel route of the visitor object in the screen coordinate system into a travel route of the visitor in a floor plan serving as a real-world coordinate system. The method of top-view transformation is not limited to the foregoing and may be performed using various methods that may be easily used by those skilled in the art.

More specifically, the visitor information acquisition apparatus may first acquire a travel route of the visitor's head region object in the screen coordinate system.

Further, the visitor information acquisition apparatus may acquire a distance from a center coordinate point a of the head region to a lower end of the visitor's body region using the perspective model. As a result, on the basis of the acquired coordinates of the lower end of the visitor object, the travel route of the visitor object in the screen coordinate system may be acquired. Thereafter, the visitor information acquisition apparatus may perform a top-view transformation on the travel route of the visitor object in the screen coordinate system, and acquire the travel route of the visitor in the floor plan as shown in FIG. 7B through a perspective transformation as shown in FIG. 7A.

The above-described apparatus may be implemented with hardware components, software components, and/or a combination of the hardware components and software components. For example, the apparatus and components described in connection with the embodiments of the invention may be implemented with one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications executed on the operating system. Further, in response to the execution of the software, the processing device may access, store, operate, process, and create data. For the convenience of understanding, it is described in some cases that one processing device is used. However, those skilled in the art would understand that the processing device may include a plurality of pieces and/or types of processing elements. For example, the processing device may include a plurality of processors, or include a single processor and a single controller. Further, the processing device may have a different processing configuration such as a parallel processor.

The software may include computer programs, codes, instructions, or a combination of the foregoing, and may configure the processing device to operate as desired or instruct the processing device in an independent or collective manner. The software and/or data may be permanently or temporarily embodied in some type of machine, component, physical equipment, virtual equipment, computer storage medium or device, or transmitted signal wave, so as to be interpreted by the processing device or provide instructions or data to the processing device. The software may be distributed on computer systems connected to a network, and stored or executed in a distributed manner. The software and data may be stored on one or more computer-readable recording media.

The method according to the embodiments of the invention may be implemented in the form of program instructions that can be executed by various computer components, and stored on a computer-readable recording medium. The computer-readable recording medium may include program instructions, data files, and data structures, separately or in combination. The program instructions stored on the computer-readable recording medium may be specially designed and configured for the embodiments of the invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be configured to operate as one or more software modules to perform the operations of the embodiments of the invention, and vice versa.

Although the embodiments of the invention have been described above in terms of the limited embodiments and drawings, various modifications and changes may be made from the above description by those skilled in the art. For example, appropriate results may be achieved even if the described techniques are performed in a different order from the described method, and/or the components of the described system, structure, apparatus, circuit, and the like are coupled or combined, or replaced with other components or equivalents, in a different form from the described method.

Therefore, other implementations, other embodiments, and equivalents of the appended claims will also fall within the scope of the claims.

What is claimed is:

1. A visitor information acquisition method performed by a computing apparatus, comprising the steps of:
   detecting one or more visitor objects from a video;
   estimating attribute information of a first visitor using feature data of a first visitor object;
   acquiring a perspective model of the first visitor on the basis of a travel route of the first visitor object; and
   acquiring interaction information of the first visitor using the perspective model of the first visitor,
   wherein in the step of detecting the one or more visitor objects from the video, in response to a plurality of visitor objects being detected from the video, it is determined whether the plurality of visitor objects are simultaneously detected from a single frame of the video, and according to a result of the determination, it is determined whether to synchronize identification values of the plurality of visitor objects, and
   wherein in the step of acquiring the perspective model, a trend plane for each of the one or more visitor objects is acquired using a bounding box corresponding to a head region of each of the one or more visitor objects, and the perspective model of the first visitor is acquired by applying a constant corresponding to a height of the first visitor to a straight line representing a line of intersection between the trend plane for each of the one or more visitor objects and a xy-plane.

2. The visitor information acquisition method of claim 1, wherein the step of detecting the one or more visitor objects comprises the steps of:
   detecting the first visitor object and a second visitor object; and
   changing an identification value of a second visitor to an identification value of the first visitor when similarity between the feature data of the first visitor object and feature data of the second visitor object is not less than a reference value.

3. The visitor information acquisition method of claim 2, wherein the step of changing the identification value of the second visitor to the identification value of the first visitor comprises the step of:
   not changing the identification value of the second visitor to the identification value of the first visitor when the first visitor object and the second visitor object are detected from a single frame.

4. The visitor information acquisition method of claim 1, wherein the perspective model is a linear model for transforming a screen coordinate system of the video to a real-world coordinate system, and
   wherein the step of acquiring the interaction information of the first visitor comprises the steps of:
   acquiring a travel route of the first visitor object using the perspective model of the first visitor;
   converting a travel route of the first visitor object in the screen coordinate system into a travel route of the first visitor in the real-world coordinate system on the basis of the perspective model of the first visitor; and
   acquiring the interaction information of the first visitor using the travel route of the first visitor in the real-world coordinate system.

5. The visitor information acquisition method of claim 4, wherein the step of estimating the attribute information of the first visitor comprises the step of:
   acquiring pose data of the first visitor using the feature data of the first visitor object, and
   wherein the step of acquiring the interaction information of the first visitor comprises the step of:
   using information on a product corresponding to the travel route of the first visitor in the real-world coordinate system and the pose data of the first visitor to acquire information on the first visitor's interaction with the product.

6. The visitor information acquisition method of claim 4, wherein the step of acquiring the interaction information of the first visitor comprises the steps of:
   acquiring a region-specific interest index of the first visitor on the basis of the travel route of the first visitor in the real-world coordinate system and a travel time; and
   designating a category of the first visitor using the region-specific interest index of the first visitor and the interaction information of the first visitor, and wherein the category of the first visitor includes a visiting customer, an interested customer, an intrigued customer, and a purchasing customer.

\* \* \* \* \*